Figure 14:
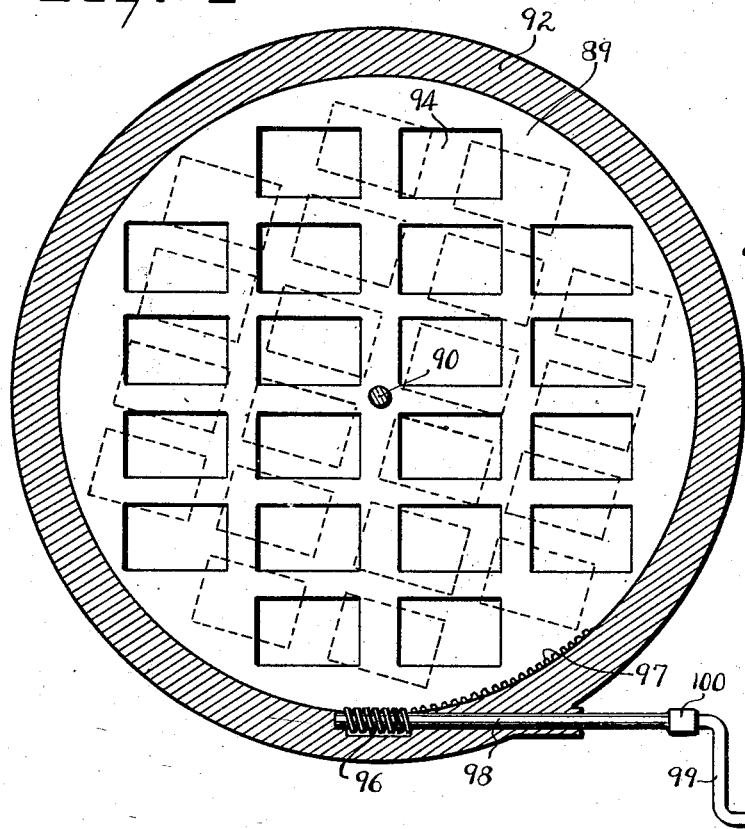

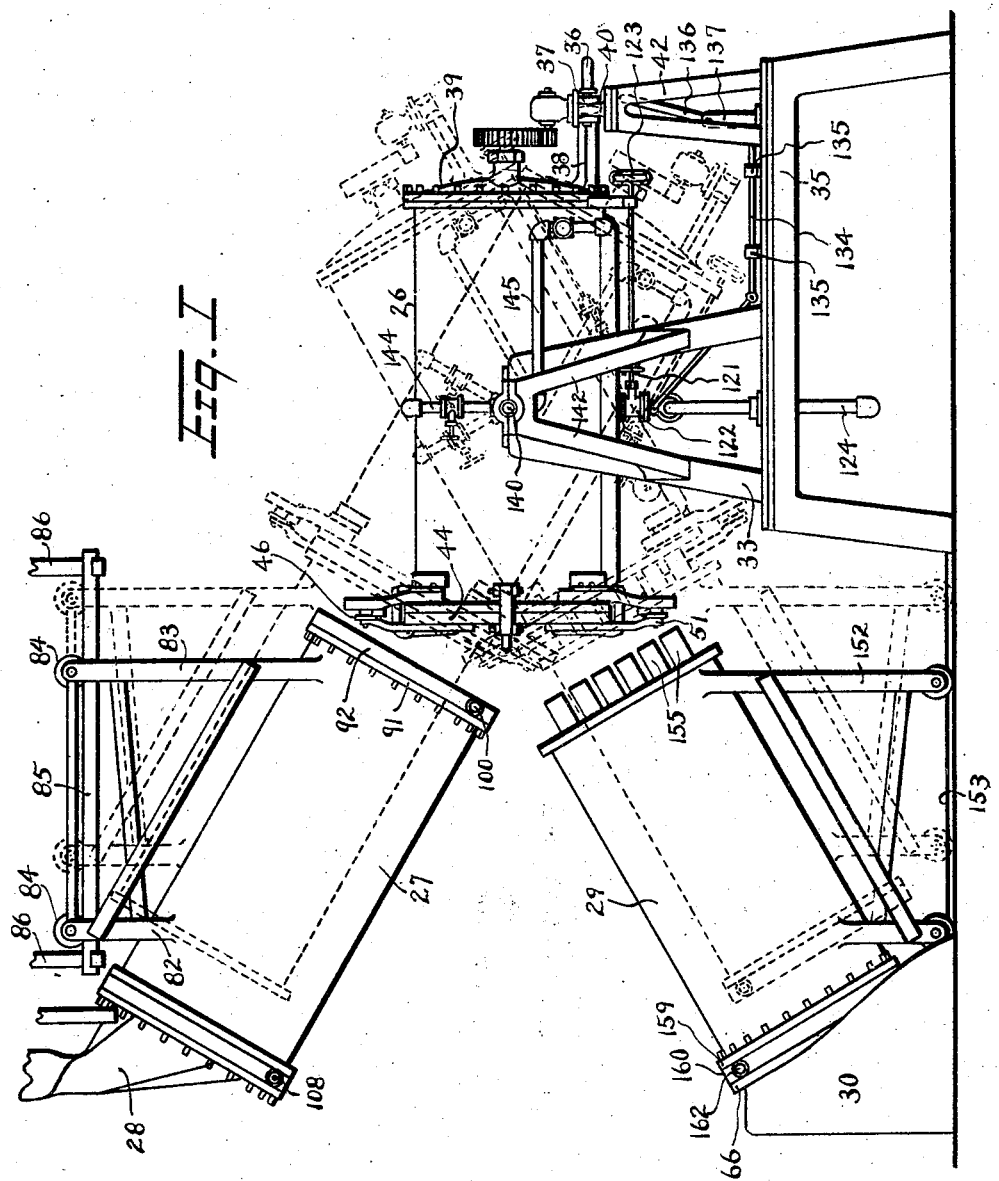

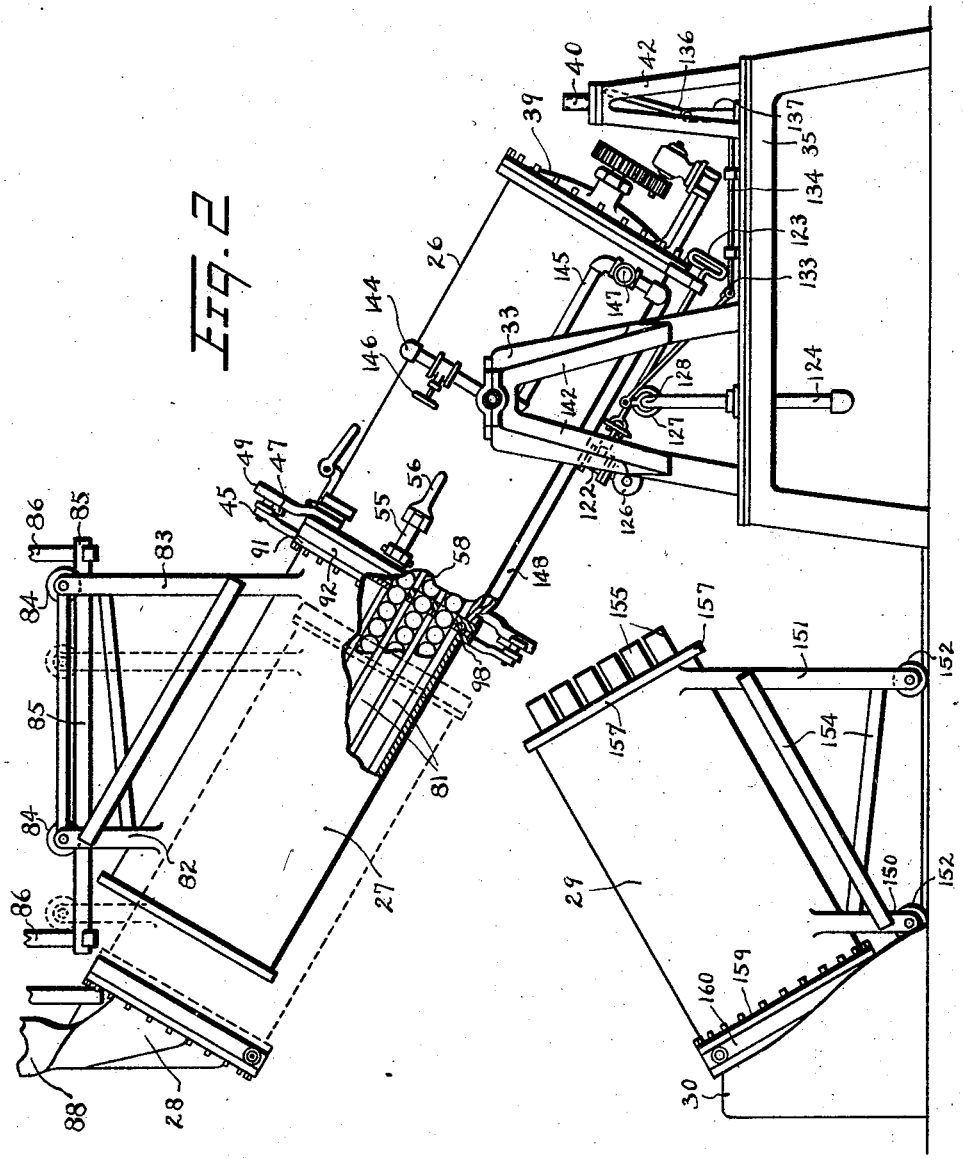

Oct. 25, 1927. 1,646,713
B. E. TAYLOR
STERILIZING APPARATUS
Filed Jan. 28, 1926  13 Sheets-Sheet 3
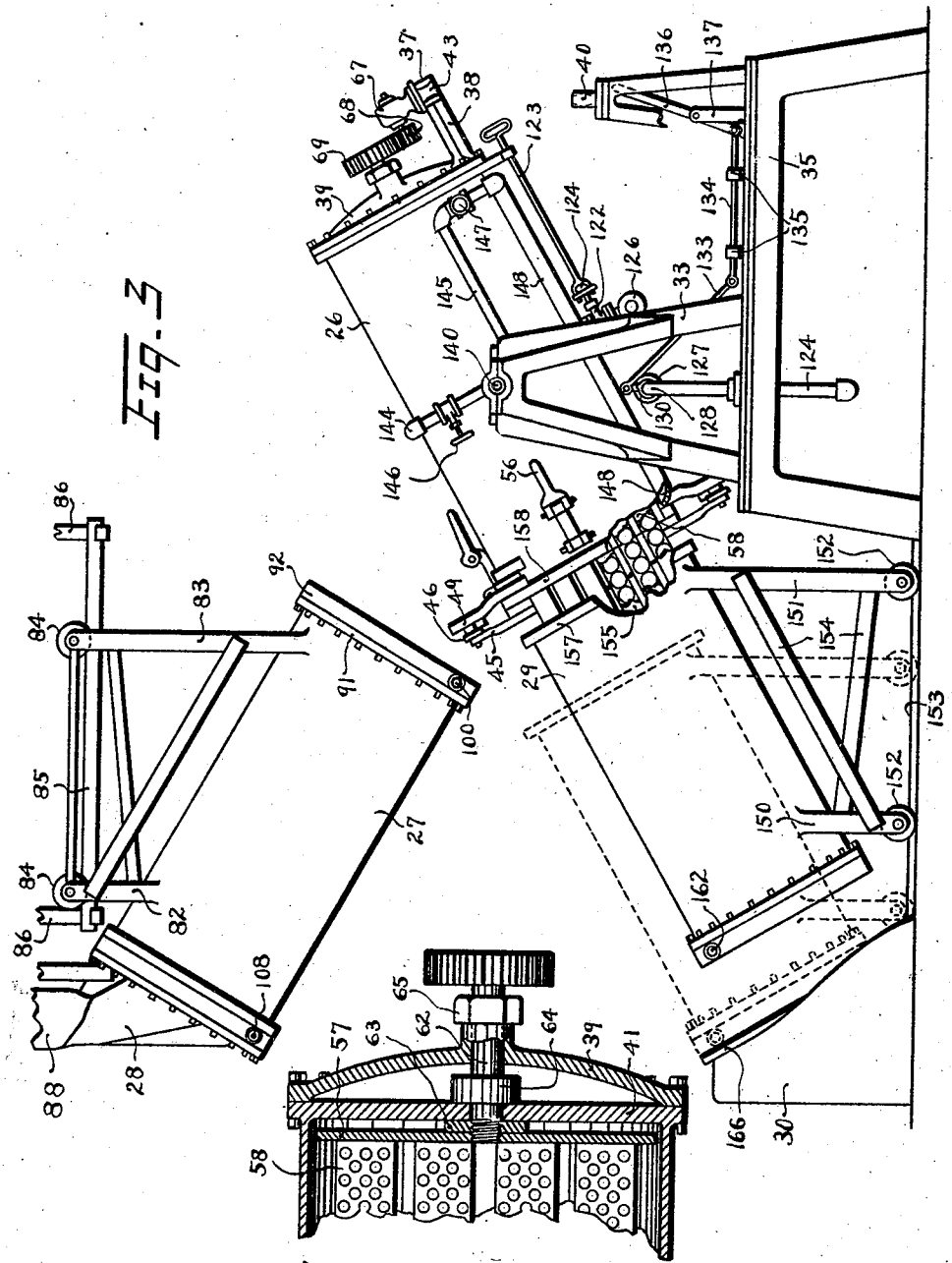

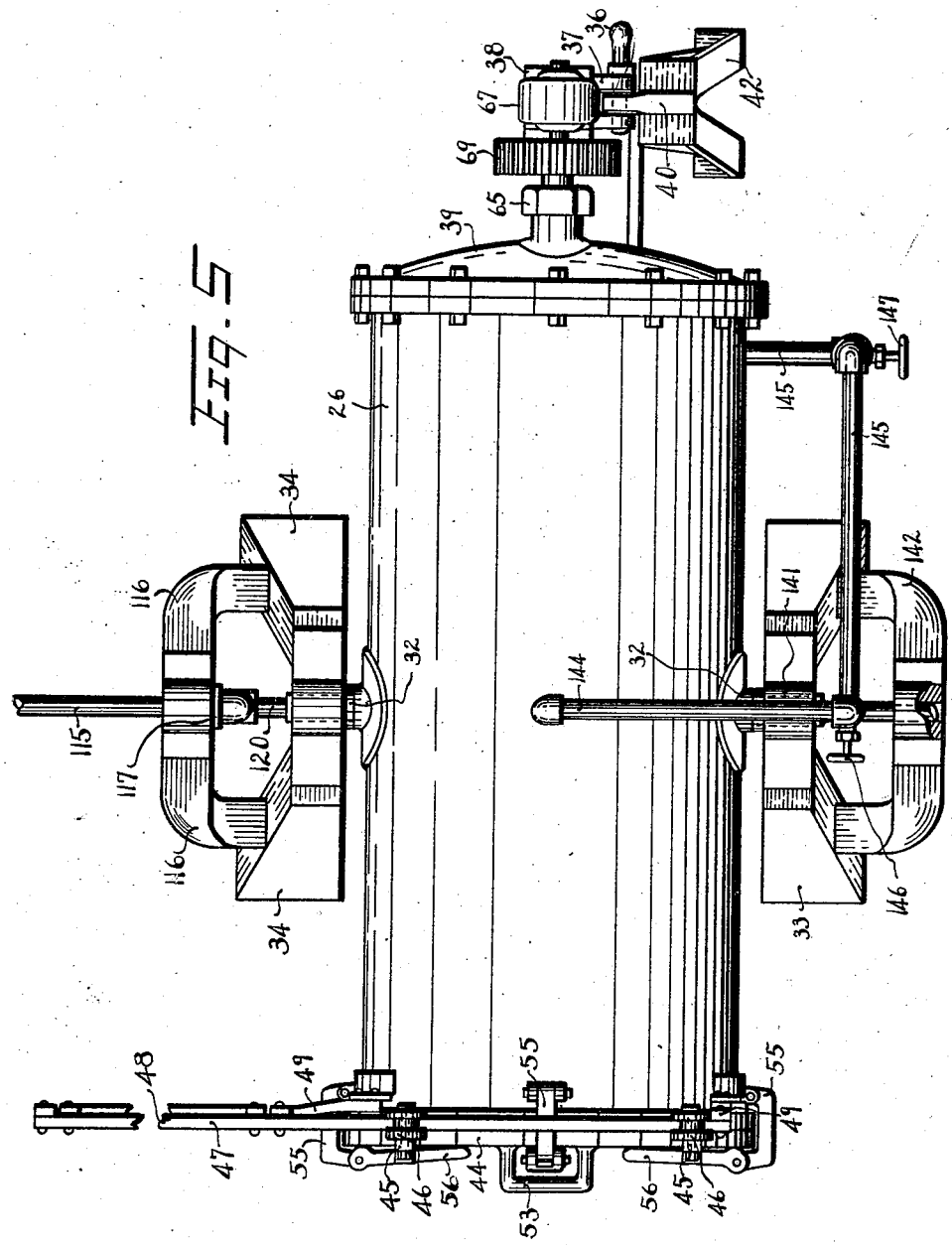

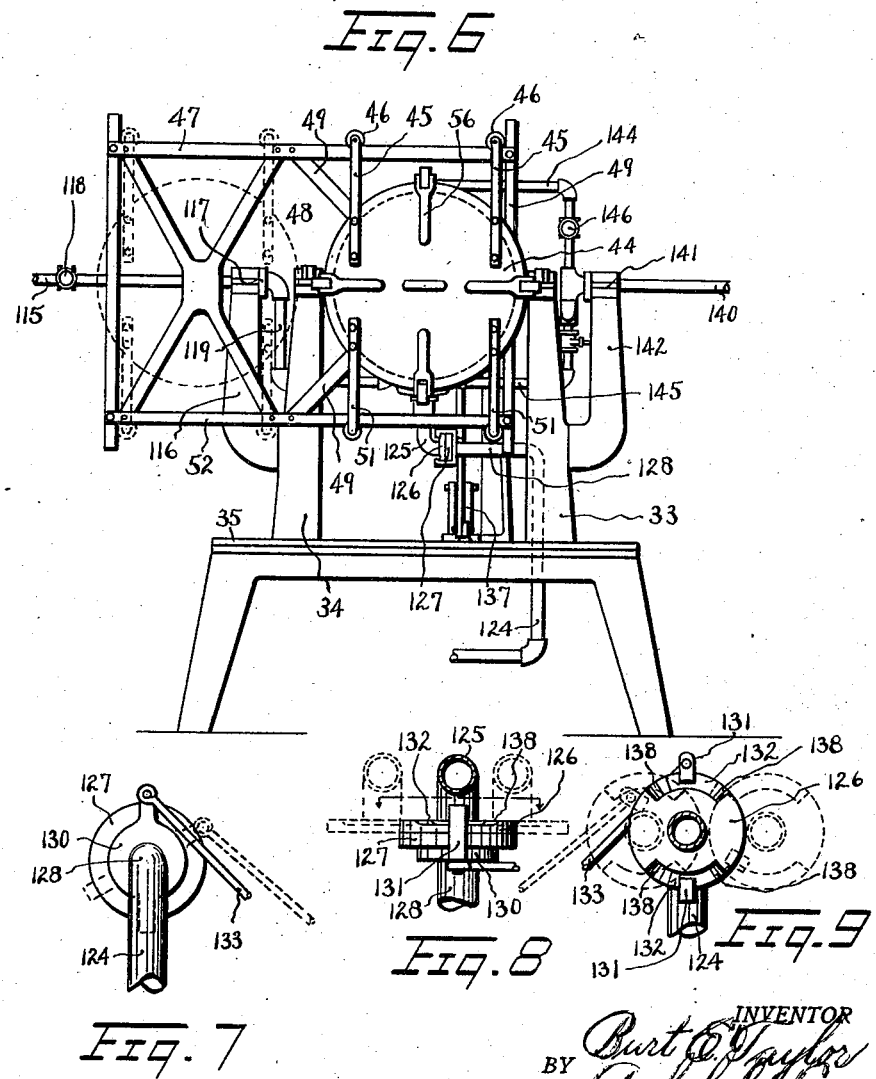

Oct. 25, 1927.
B. E. TAYLOR
1,646,713
STERILIZING APPARATUS
Filed Jan. 28, 1926
13 Sheets-Sheet 6
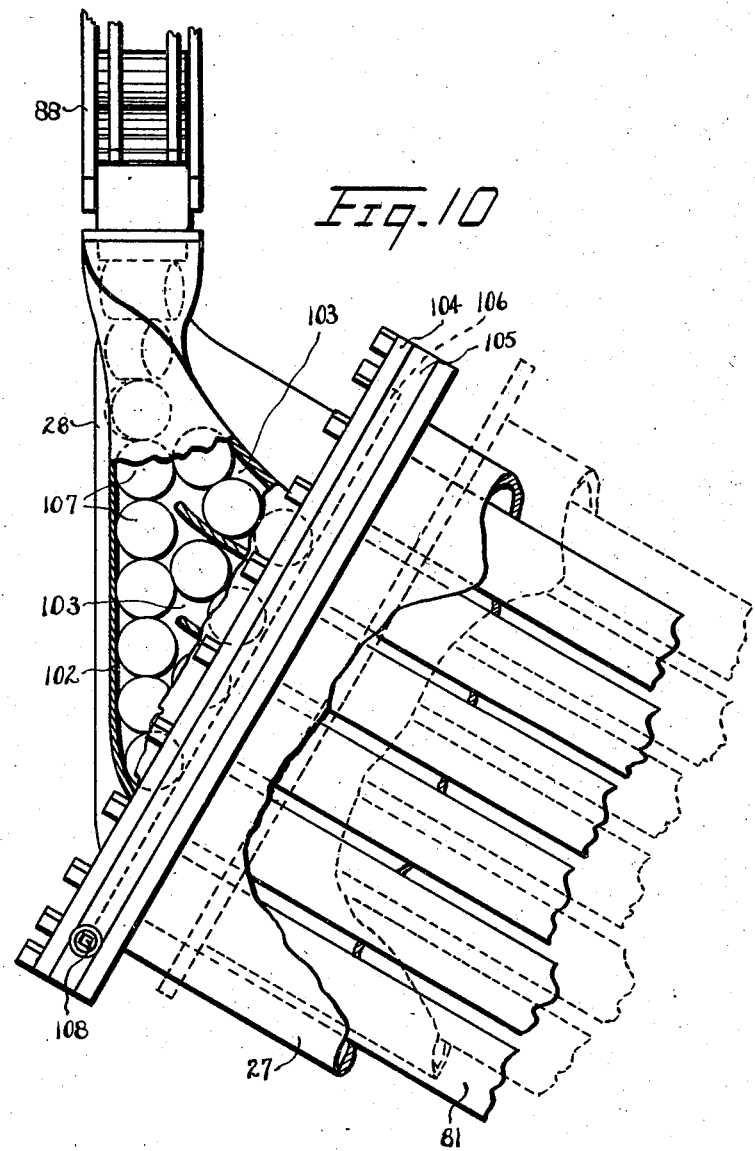

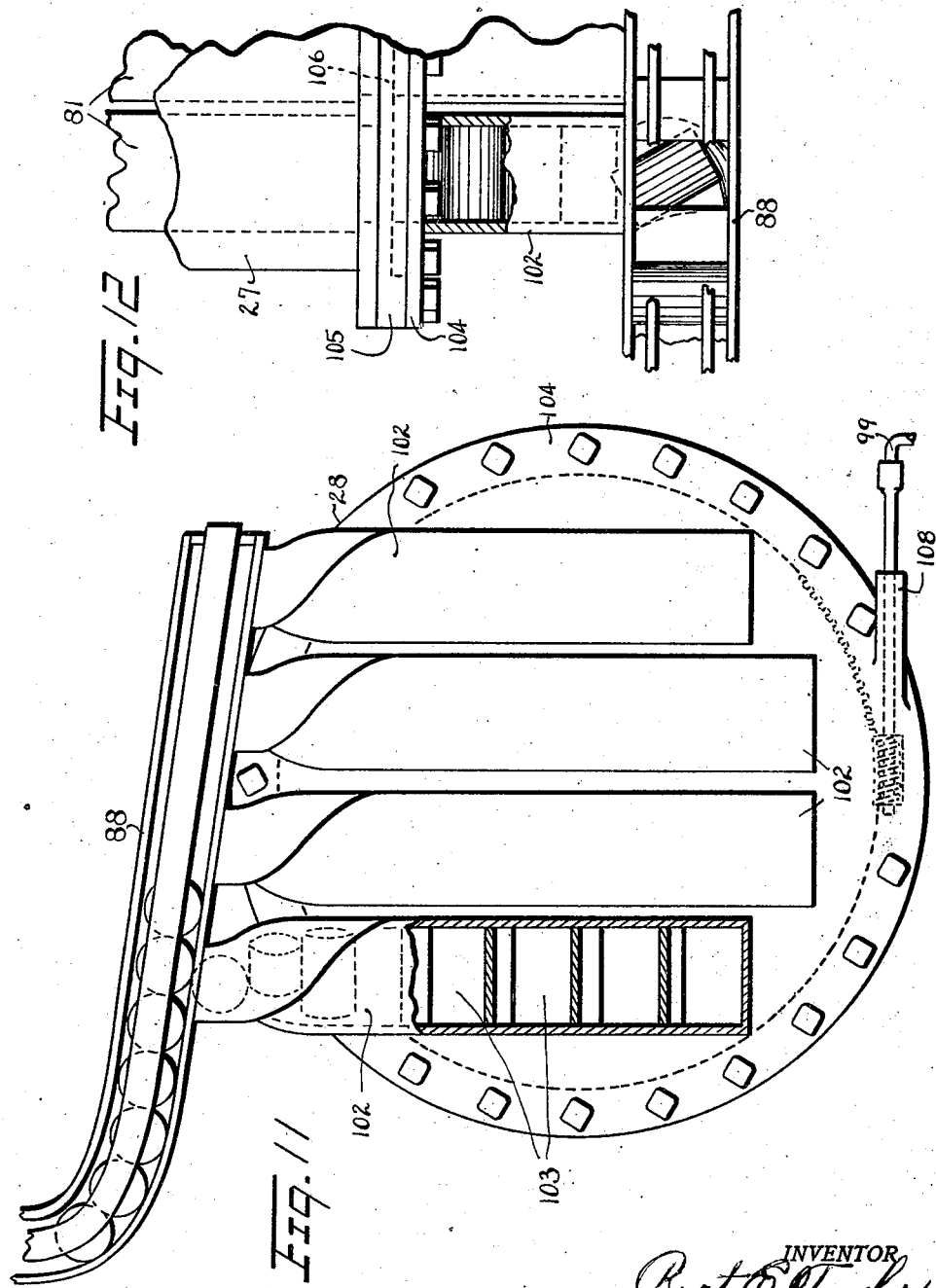

Oct. 25, 1927.

B. E. TAYLOR 1,646,713

STERILIZING APPARATUS

Filed Jan. 28, 1926

13 Sheets-Sheet 8

INVENTOR
Burt E. Taylor
BY Archibald Cox
ATTORNEY

Oct. 25, 1927. 1,646,713
B. E. TAYLOR
STERILIZING APPARATUS
Filed Jan. 28, 1926 13 Sheets-Sheet 9
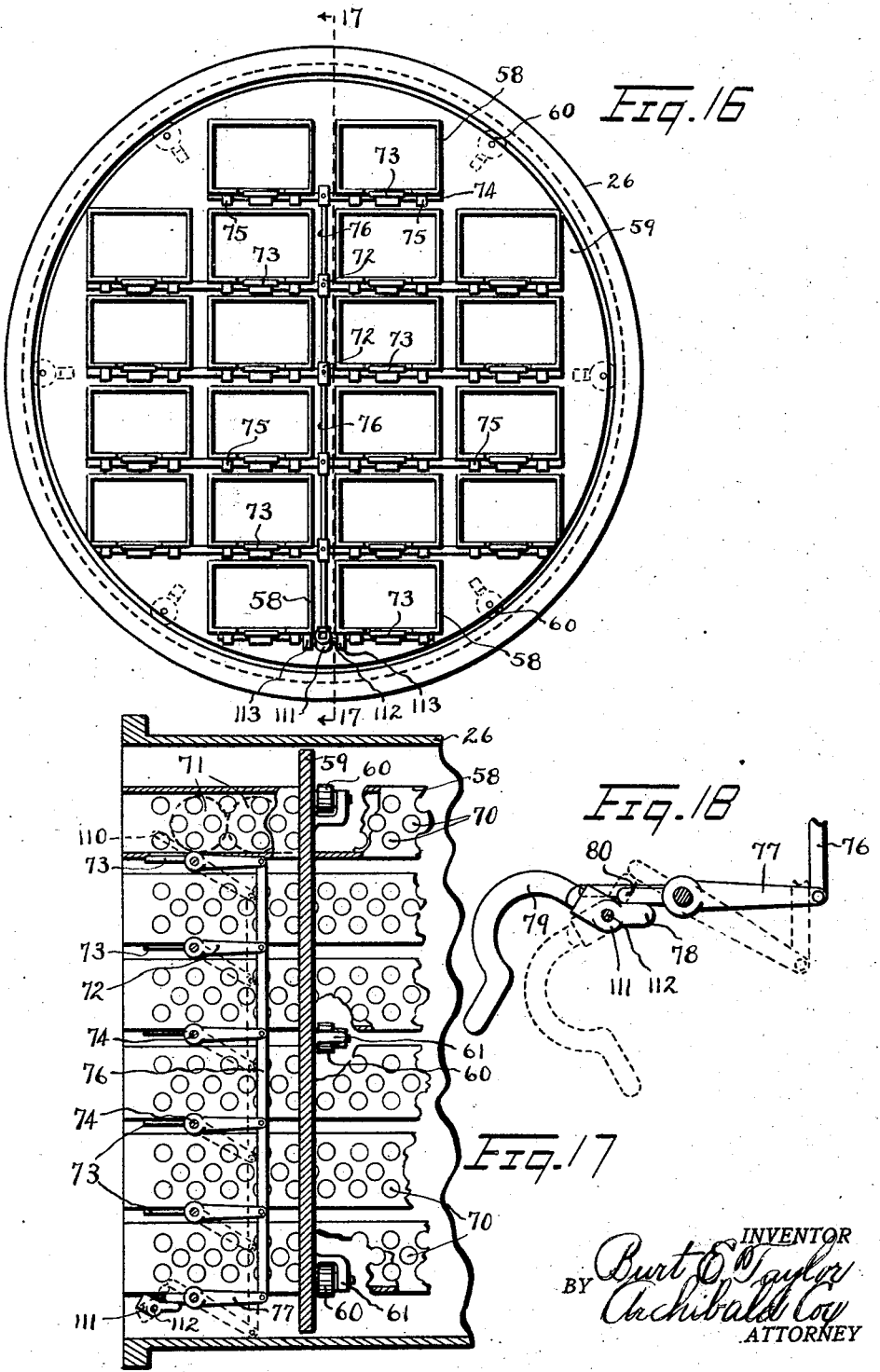
INVENTOR
Burt E Taylor
BY Archibald Coy
ATTORNEY

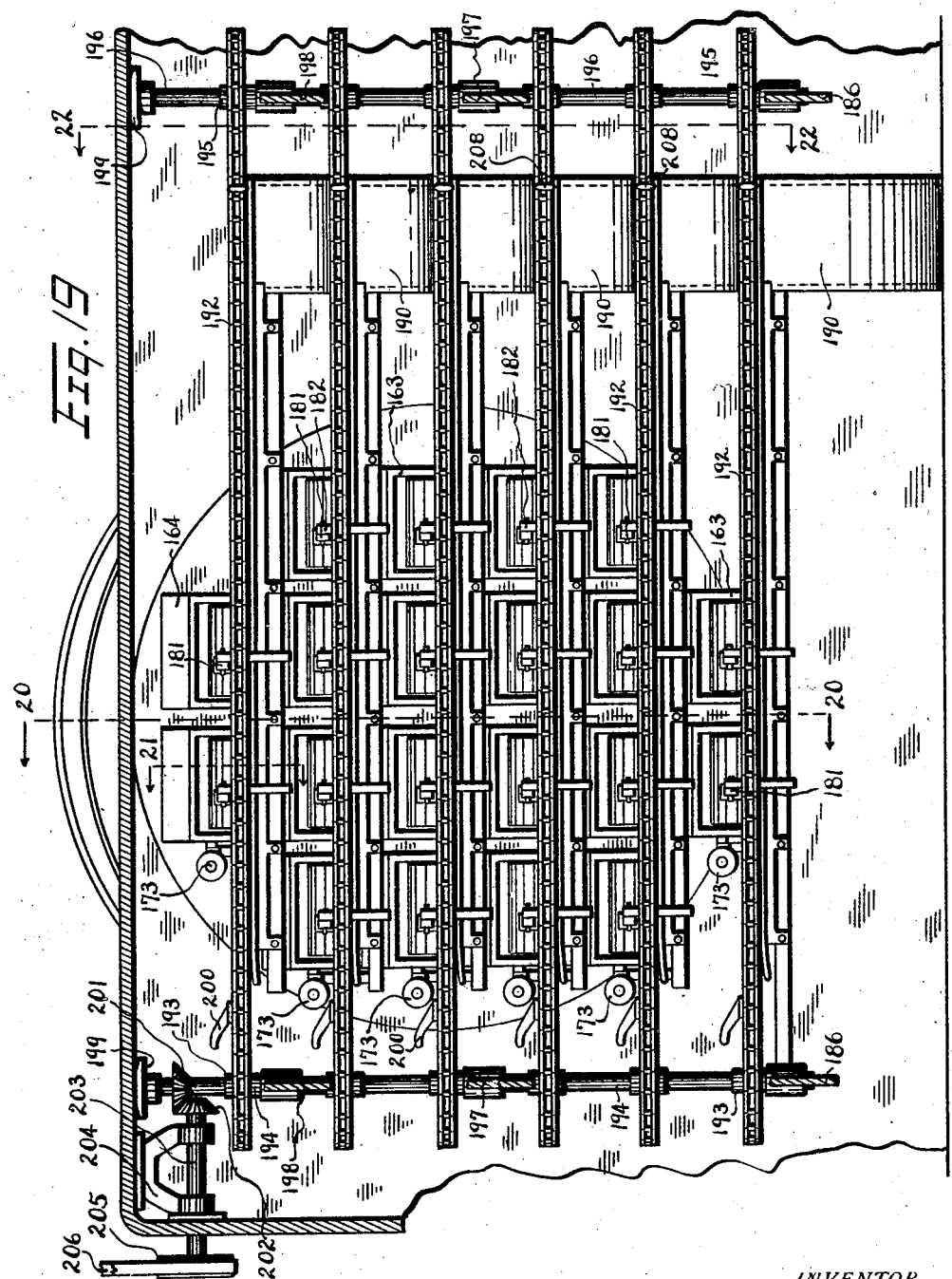

Oct. 25, 1927.
B. E. TAYLOR
1,646,713
STERILIZING APPARATUS
Filed Jan. 28, 1926
13 Sheets-Sheet 11
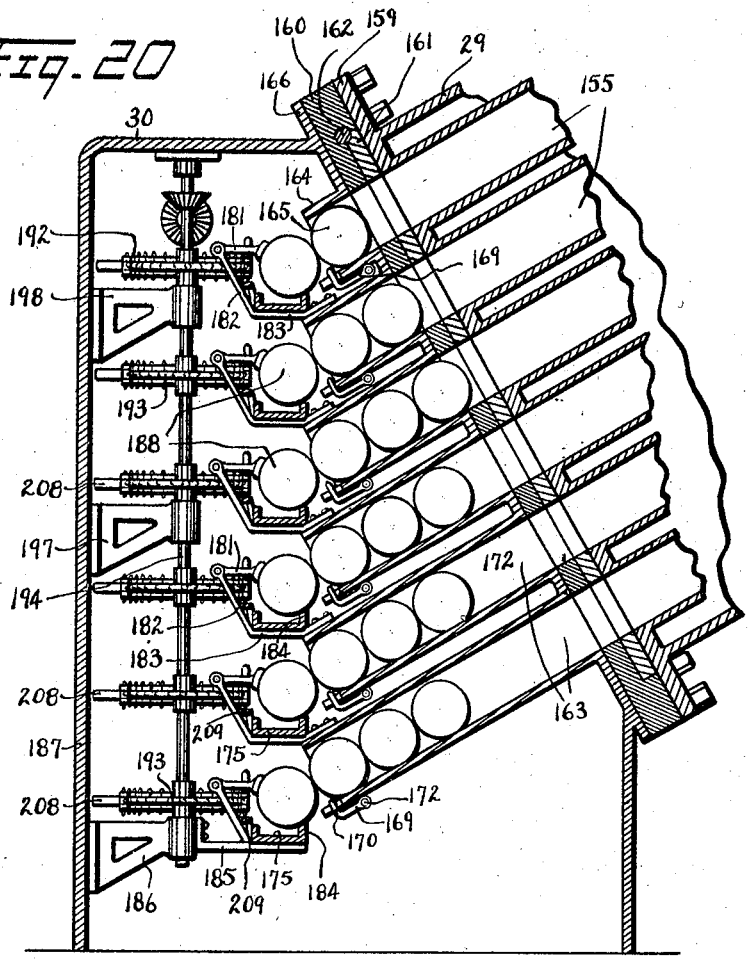
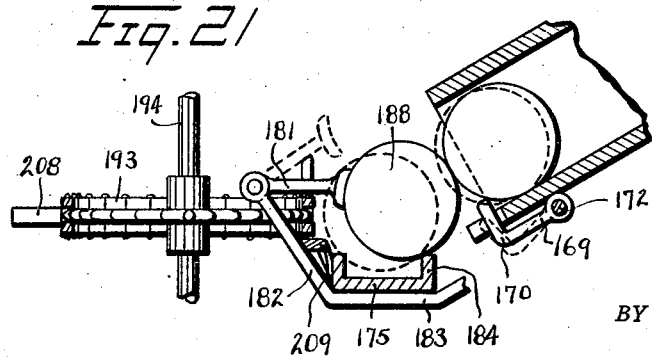
INVENTOR
Burt E. Taylor
BY Archibald Coy
ATTORNEY

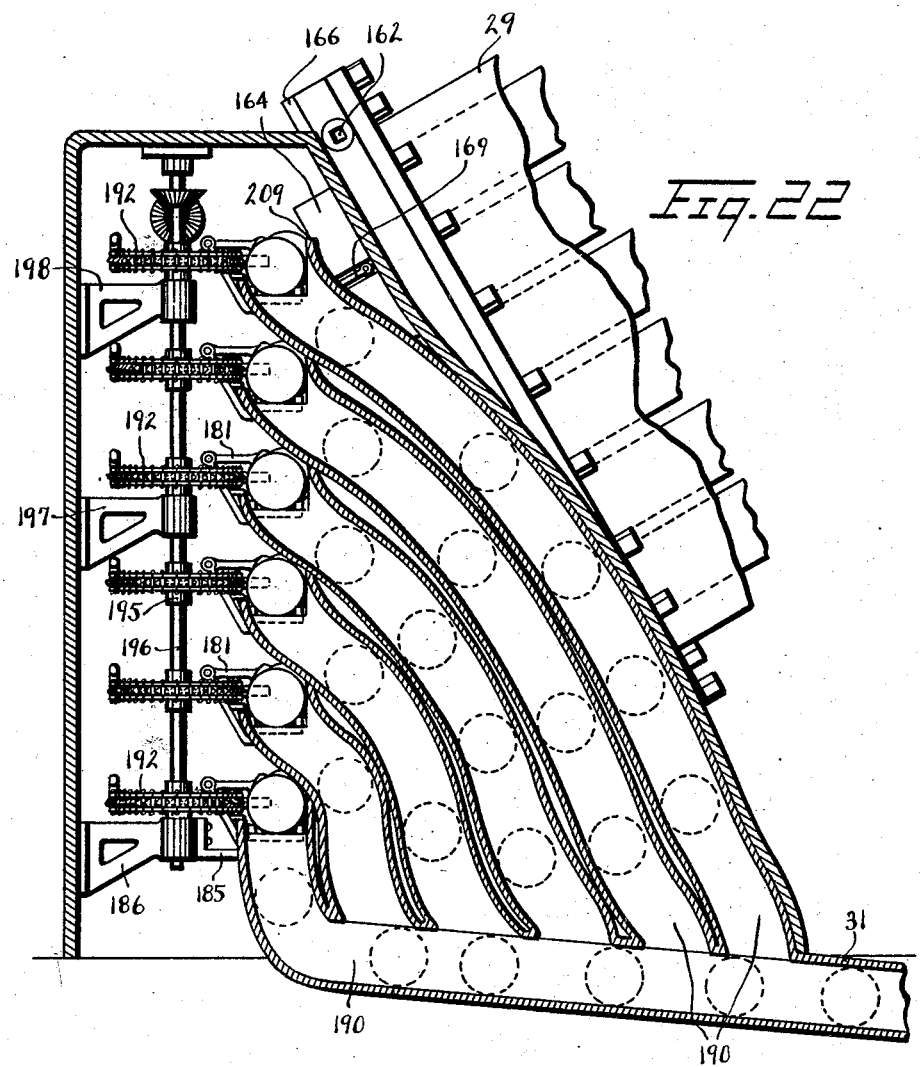

Oct. 25, 1927.

B. E. TAYLOR 1,646,713

STERILIZING APPARATUS

Filed Jan. 28, 1926

13 Sheets-Sheet 13

INVENTOR
Burt E. Taylor
BY Archibald Cox
ATTORNEY

Patented Oct. 25, 1927.

1,646,713

UNITED STATES PATENT OFFICE.

BURT E. TAYLOR, OF MOUNT VERNON, NEW YORK, ASSIGNOR TO THE BORDEN COMPANY, OF NEW YORK, N. Y., A CORPORATION OF NEW JERSEY.

STERILIZING APPARATUS.

Application filed January 28, 1926. Serial No. 84,305.

The invention relates to an improvement in sterilizing apparatus, and more particularly to an improvement in apparatus especially adapted for sterilizing food products such as evaporated milk put up in hermetically sealed cans.

According to the common practice prevailing at the present time the cans of evaporated milk are taken from the testing vat and loaded into trays having a capacity of about twenty-four cans each. These trays are stacked up three to five high in racks on a rotatable spider mounted in a cylindrical sterilizing apparatus in which the cans are subjected to the sterilizing medium, usually steam or heated water. With this arrangement of apparatus it has been found difficult to subject all the cans uniformly to the sterilizing treatment. On the completion of the sterilizing operation, the trays are removed from the spider. The cans are then taken from the trays and fed into a shaking device by which the contents of the cans are thoroughly agitated to secure homogeneity of mixture. This mode of treating the cans requires considerable handling of the cans in small lots, either directly by hand or through the instrumentality of labor saving devices.

One object of the present invention is to produce a sterilizing apparatus of such construction as to assure that all the cans in the sterilizer will be subjected uniformly to the sterilizing medium. Another object of the invention is to facilitate the handling of the cans and shorten the time heretofore required for introducing the cans into the sterilizer and removing them therefrom. This object is attained by eliminating the necessity of (1) loading the cans into the trays in which they are at the present time placed in the sterilizer and (2) unloading the cans from the trays after the sterilizing operation. A more specific object of the invention is to produce an improved sterilizing apparatus of such construction that it may be made a part of a line or system of apparatus and machinery for handling canned food products, such as evaporated milk. Other specific objects of the invention relate to improvements in the sterilizer proper, to the various means and devices cooperating to feed the sterilized cans to and take them from the sterilizer, and to the means for feeding them into the chute or runway leading to the can shaking devices.

According to the present invention the sterilizer, that is, the receptacle in which the cans are subjected to the sterilizing medium is so mounted that it may be moved to one position to receive the cans to be sterilized and moved to another position to discharge the sterilized cans. In the preferred arrangement of apparatus the sterilizer is mounted on horizontal trunnions so that it may tilt in a vertical plane. One end of the sterilizer is provided with a removable door or cover so that the cans may be fed into and discharged from the sterilizer when it has been tilted to the proper positions. When the cover is removed and the sterilizer has been tilted to direct its open end upwardly, a charging magazine which has been supplied with a batch of cans from a hopper is moved into engagement with the open end of the sterilizer and the cans therein are released so that they will run down into the sterilizer. When the open end of the sterilizer is directed downwardly immediately following the sterilizing operation another magazine is moved into alinement with the sterilizer to receive the charge of sterilized cans. The second magazine then discharges the cans into a mechanism by which they are fed into the chute leading to the can shaking devices. The improved sterilizing apparatus is more specifically described hereinafter and is particularly pointed out in the appended claims.

Figure 13:
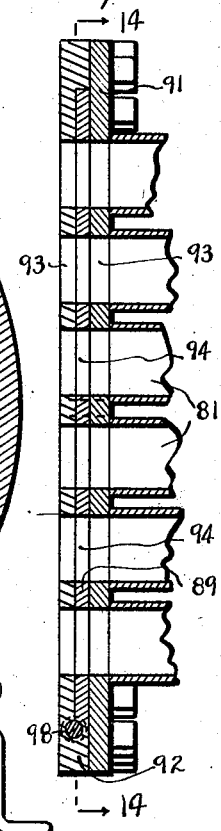
Figure 15:
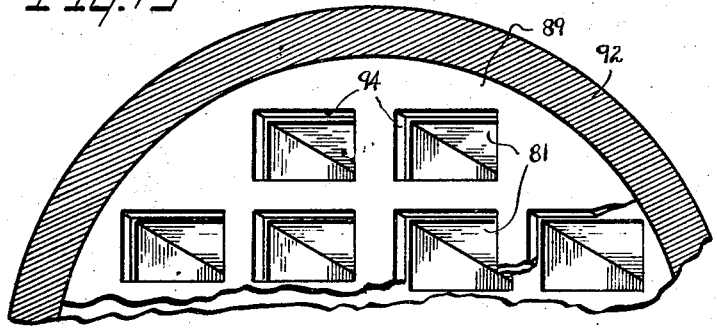
Figure 23:
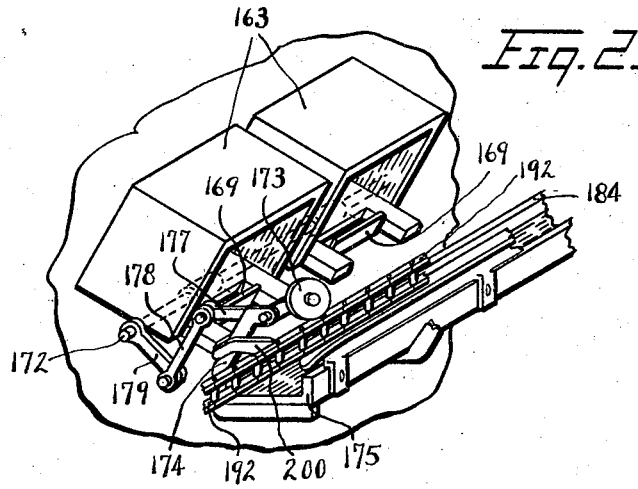
Figure 24:
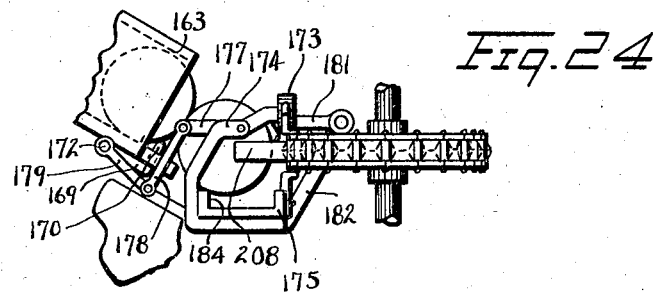
Figure 25:
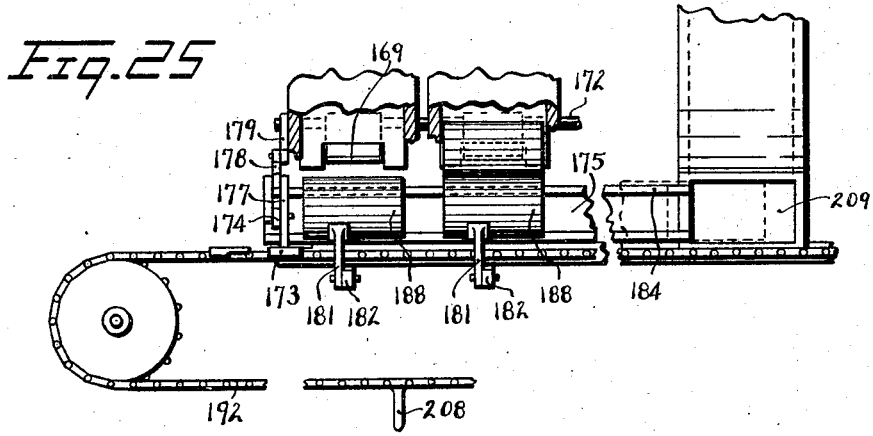

The preferred form of the invention is illustrated in the accompanying drawings, in which Fig. 1 is a side elevation of the improved sterilizing apparatus, showing the sterilizer in position for the sterilizing operation, the loading magazine in position to receive unsterilized cans, and the receiving magazine in position to discharge the sterilized cans, and showing in dotted lines the can receiving position of the sterilizer and the can discharging position thereof; Fig. 2 is a side elevation similar to Fig. 1, with a portion broken away, showing the sterilizer in position to receive the unsterilized cans from the loading magazine; Fig. 3 is a view similar to Fig. 2 showing the sterilizer in position discharging the sterilized cans into the receiving magazine; Fig. 4 is a section on an enlarged scale through the rear end of the sterilizer, showing the method of mounting the rear end of the rotary spider in the shell of the sterilizer; Fig. 5 is a plan on an enlarged scale of the sterilizer; Fig. 6 is a front end elevation of the sterilizer; Figs. 7, 8 and 9 are, respectively, a rear elevation, a top plan and a front elevation of the detachable drain pipe connection; Fig. 10 is a side elevation on an enlarged scale, with certain parts broken away, of the hopper and of the upper end of the loading magazine, showing the magazine in position to receive the unsterilized cans from the hopper; Fig. 11 is an end elevation, with a portion broken away, of the parts shown in Fig. 10; Fig. 12 is a partial plan, with a portion broken away, of the parts shown in Fig. 10; Fig. 13 is a partial longitudinal section through the discharge end of the loading magazine; Fig. 14 is a section taken along the line 14—14 of Fig. 13; Fig. 15 is a perspective of the upper portion of the parts shown in Fig. 14, with the point of view a little below the center of the figure and looking upwardly; Fig. 16 is an end elevation of the front or open end of the sterilizer; Fig. 17 is a section taken along the line 17—17 of Fig. 16; Fig. 18 is a detail of the arm and wrench for manipulating the stop fingers at the front end of the sterilizer; Fig. 19 is a transverse section showing in end elevation the transferring mechanism; Fig. 20 is a longitudinal section taken on the line 20—20 of Fig. 19; Fig. 21 is a section on an enlarged scale taken along the line 21—21 of Fig. 19; Fig. 22 is a section taken along the line 22—22 of Fig. 19; Fig. 23 is a perspective of the ends of two of the chutes of the transferring mechanism, showing the stop control mechanism; Fig. 24 is a side elevation looking from the left of one unit of the transferring mechanism; and Fig. 25 is a plan, with a part broken away, of one of the units of the transferring mechanism.

The improved sterilizing apparatus as illustrated in the drawings comprises a sterilizer proper, generally indicated at 26, a charging magazine 27 which receives a batch of unsterilized cans from the hopper 28 and feeds them into the sterilizer, and a receiving magazine 29 which receives the sterilized cans from the sterilizer and discharges them into a transferring mechanism 30 by which the cans are fed into a chute 31 (Fig. 22) leading to the can shaking devices.

The sterilizer 26 is a cylindrical shell provided at the middle points of its lateral sides with the trunnions 32 by which it is pivotally mounted in the upper ends of the pairs of standards 33 and 34 supported on the table 35. The sterilizing operation is carried on while the sterilizer is in its horizontal position, as shown in full lines in Fig. 1. The sterilizer is held in this position by means of a pin 36 which passes through an alined hole in the bifurcated projection 37 of a platform 38 extending outwardly from the rear cover 39 of the sterilizer and in an arm 40 extending laterally from the upper end of a standard 42 supported on the table 35. The sides of the slot 43 in the projection 37 and the sides of the arm 40 are convex so that the projection 37 may swing clear of the arm 40 both downwardly and upwardly when the sterilizer is tilted to its can receiving and to its can discharging positions.

The rear end of the cylindrical shell of the sterilizer 26 is closed by an inner or false cover 41 (Fig. 4). The forward end of the sterilizer is closed during the sterilizing operation by means of a cover 44 which is so mounted that it may be slid out of the way when the sterilizer is to be tilted into its can receiving and can discharging positions. For this purpose the cover 44, which is substantially a disk in shape, is provided with two upwardly extending arms 45 on the upper ends of which are mounted the rollers or wheels 46 arranged to travel on the runway 47 which is the upper horizontal piece of a frame work generally indicated at 48 supported from the forward end of the shell of the sterilizer by the brackets 49. Two downwardly projecting arms 51 provided at their lower ends with rollers or wheels which engage with the lower horizontal bar or runway 52 assist in guiding the cover 44 as it is slid away from and returned to the open forward end of the sterilizer. The cover 44 is provided with a forwardly extending handle 53 by which it may be moved by the operator. It will be observed that the above described construction is such that the frame work 48 and the cover 44 swing upwardly with the sterilizer into can receiving position and downwardly with the sterilizer into can discharging position, as indicated in Figs. 2 and 3.

The cover 44 is held in position on the forward end of the sterilizer during the sterilizing operation by means of four equally-spaced clamps 55 mounted on the forward end of the shell of the sterilizer, and provided with the operating handles 56. These clamps are of usual construction and mode of operation.

In order to effect a thorough sterilization of the contents of all the cans in the sterilizer the cans are so positioned and held in the sterilizer that they are all uniformly subjected to the sterilizing medium. The sterilization operation is made more effective by causing the batch of cans in the sterilizer to rotate as a whole. To secure these ends the sterilizer is provided with a rotatably mounted magazine, or spider, as it is termed in the art. This spider comprises a series of longitudinally disposed tubes or chambers 58 rectangular in cross-section and extending throughout the length of the sterilizer. By reference to Fig. 16 it will be seen that there are four tiers of these elongated tubes 58, the two lateral tiers consisting of four tubes each and the two middle tiers consisting of six tubes each. The tubes pass through and are supported at intervals throughout the length of the sterilizer by means of the disk-like plates 59 (Fig. 17), only one of which is indicated. The periphery of each plate 59 is provided with a series of equally spaced rolls 60 journaled in the plate and in the brackets 61 supported therefrom, and bearing against the interior periphery of the cylindrical shell of the sterilizer. The rear ends of the tubes 58 are secured to a circular plate 57 into the center of which is screwed the inner end of a shaft 62 journaled in the center of the rear cover 39 of the sterilizer. The inner end of the shaft 62 is held in the center of the plate 57 and in the washer 63 (which separates the plate 57 from the inner or false cover 41) by means of a collar 64 pinned or otherwise secured to the shaft 62. A stuffing box 65 threaded onto the outer end of the shaft 62 and bearing against the central hub-like part of the cover 39 prevents leakage and aids in holding the shaft 62 in operative position. Inasmuch as the plate 57 is supported by the inner end of the shaft 62 it is unprovided with rolls. Power is supplied to rotate the can supporting spider by the motor 67 supported on the outer end of the platform 38. A pinion 68 mounted on the inner end of the motor shaft meshes with and drives the gear 69 mounted on the outer end of the shaft 62.

A free passage or circulation of the sterilizing fluid around the cans as they are revolving in the sterilizer due to the rotation of the spider is secured by perforating the tubes 58, as indicated by the holes 70 in Fig. 17. When the cans to be sterilized have been fed into the sterilizer from the magazine 27 they are positively held in the tubes 58 until they are discharged from the sterilizer after sterilization. The means for holding the cans (indicated by the dotted lines 71 in Fig. 17) in the tubes during sterilization and until the sterilizer is in proper relation with the receiving magazine 29 comprises a series of stop fingers 73, there being one stop finger 73 located at the open end of each tube 58. Each row of stop fingers 73 is mounted on a shaft 74 journaled in the bosses 75 projecting from the bottoms of the tubes 58. The stop fingers are all articulated together so as to be operated simultaneously by means of a vertically disposed rod 76 pivotally connected with the rear ends of a series of arms 72 secured to and extending rearwardly from the shafts 74. The lowermost arm 77 is provided with a forwardly projecting part 80 adapted to be engaged by the arm 78 of a socket 111 fixed on a shaft 112 journaled in the bosses 113 depending from the under surfaces of the lowermost tubes 58. The socket 111 is adapted to receive a wrench 79 by which the stop fingers 73 are manipulated. The handle part of the wrench 79 is curved so that the active part of the wrench may be withdrawn from the socket 111 while the sterilizer is in close proximity to the receiving magazine 29 just previous to the discharge of the sterilized cans from the sterilizer into the receiving magazine. After the cans have been fed into the sterilizer from the charging magazine 27, the arms 72 are turned in a clockwise direction by depressing the socket 111 to place the stop fingers 73 in front of the cans to prevent the cans from sliding out of the tubes while the sterilizer is being tilted into discharging position. It is considered desirable to put the stop fingers 73 into operative position while the sterilizer is still tilted upwardly, because at this time the cans are fully within the tubes and in position to permit the stop fingers to be swung up in front of the foremost cans in the tubes. The length of the tubes from the rear ends thereof to the stop fingers is such that when the appropriate number of cans have been introduced into the tubes the stop fingers are free to swing upwardly into operative position. If it were attempted to operate the stop fingers after the sterilizing operation and before the sterilizer is tilted downwardly, it might be that the cans had rolled forwardly and would thereby interfere with the placing of the stop fingers in operative position.

The magazine 27 for feeding or charging the cans to be sterilized into the sterilizer 26 has the same capacity as the sterilizer and comprises a cylindrical shell flanged at its upper and lower ends and provided with a series of longitudinally extending tubes 81 having the same arrangement as the tubes 58 in the sterilizer, so that when the lower end of the charging magazine 27 is in engagement with the open end of the sterilizer, as shown in Fig. 2, and the cans in the magazine 27 are released, they will roll down out of the tubes 81 into the tubes 58. The obliquely arranged magazine 27 is supported by two pairs of upwardly extending arms 82 and 83 provided at their upper ends with rollers or wheels 84 adapted to travel on the runways 85 supported from the ceiling or upper part of the room in which the apparatus is located by means of the depending pieces 86. The parts supporting the magazine 27 are shown in side elevation only and therefore only one member of each pair is shown.

The cans to be sterilized are charged into the open upper end of the magazine 27 from the hopper 28 formed on the lower end of the chute 88 which leads from the testing vat. The cans are held in the magazine 27 by means of a plate 89 pivotally mounted at 90 in the center of the plate 91 to which the lower ends of the tubes 81 and the shell of the magazine 27 are secured. The rotatable plate 89 is held in place in the lower end of the magazine 27 by means of a plate 92. The plates 91 and 92 are provided with apertures or holes 93 which are permanently in alinement with the tubes 81, as shown in Fig. 13. The apertures 94 of the plate 89 are put into alinement with the other apertures when the cans are to be fed from the magazine 27 into the sterilizer and are put out of alinement with the other apertures while the cans are being fed into the magazine 27 from the hopper 28 and until the lower end of the magazine is in engagement with the open end of the sterilizer.

The means for rotating the plate 89 to aline the openings 94 with the apertures 93 and the tubes 81 and to put them out of alinement therewith consists of a screw 96 which meshes with the toothed edge 97 of the plate 89. The screw 96 is carried on the inner end of a shaft 98 journaled in the plate 92. When the magazine 27 is moved toward the hopper to receive a charge of cans to be sterilized, the screw 96 is turned to put the holes 94 out of alinement with the tubes 81 and the apertures 93 by means of a wrench 99 inserted into the socket 100 formed on the outer end of the shaft 98. Thus the cans are held in the magazine 27 by the plate 89. When the magazine 27 has been moved into contact with the sterilizer 26, the screw 96 is turned in the reverse direction to aline the holes 94 with the apertures 93 and the tubes 81 to permit the cans to roll down into the tubes 58.

The hopper 28 comprises a series of four vertically arranged chutes or passageways 102 (Fig. 11) which extend downwardly from the chute 88. The four chutes 102 correspond to the four tiers of tubes 81 in the magazine 27. Each chute 102 is divided into as many passageways or branches 103 (Fig. 10) as there are tubes 81 in the corresponding tier of tubes in the magazine 27. The passageways 103 terminate in a plate 104 to which is secured a plate 105 corresponding to the plate 92 of the magazine 27; and between the plate 104 and plate 105 is a rotatable plate 106 which has the same construction and mode of operation as the plate 89. The plate 106 is turned to hold the cans 107 in the hopper 28 and to release them to permit them to run into the magazine 27 by means of the wrench 99 which is inserted into the socketed shaft 108 connected with the plate 106. It will be understood that when the plate 106 has been turned to release the cans in the hopper the cans running down the chute 88 and into the chutes 102 will naturally fill up the lowermost tubes first. The length of the tubes 81 and the size and arrangement of the passageways 103 are such that as the lower tubes are successively filled up the oncoming cans are directed into the upper tubes and that when all the tubes are filled the plate 106 may be turned to hold the undelivered cans in the hopper.

When the charging magazine 27 has been filled and then moved into contact with the open upturned end of the sterilizer 26, the wrench 99 is inserted into the socket 100 to turn the plate 89 to release the cans and permit them to run down into the sterilizer, filling up the tubes 58 therein. The wrench 99 is then turned in the reverse direction to turn the plate 89 into its can holding position and the magazine 27 is again moved into contact with the hopper 28. The wrench 79 is then inserted into the socket 111 and moved downwardly to depress the rod 76, thereby raising the stop fingers 73 to the positions indicated by the dotted lines 110 in front of the cans. When the stop fingers 73 have been raised into can holding position by depressing the arms 72 by means of the rod 76 the fingers 73 are held in their raised position by the engagement of the end of the arm 78 of the socket 111 with the under surface of the forward projection 80 of the arm 77, as indicated by the dotted lines in Fig. 18. The arm 78 remains in engagement with the projection 80 of the arm 77 to hold the stop fingers 73 in their can retaining position until just before the wrench 79 is manipulated to release the cans and permit them to run into the receiving magazine 29.

After the stop fingers 73 have been raised to hold the cans in the tubes 58 the cover 44 is slid into position and clamped, sealing the front end of the sterilizer. The sterilizer is then tilted to its horizontal position and held in that position by means of the pin 36. Inasmuch as the cans are held in the tubes 58 by means of the stop fingers 73 the sterilizer 26 may be swung to horizontal position before the cover 44 is slid into place and fastened to the front end of the sterilizer. The sterilizer is now in condition for the sterilizing operation.

The sterilization of the contents of the cans in the sterilizer is conveniently effected by means of steam introduced into the sterilizer from a pipe 115 connected with a convenient source of supply not shown. The steam pipe 115 is located opposite substantially the middle of one side of the sterilizer and the inner end thereof is rotatably mounted in the upper end of the arms 116 supported from the pair of uprights 34. The connection 117 between the pipe 115 and the supporting arms 116 is such that the sterilizer 26 may tilt without turning the outer part of the pipe 115 in which part the valve 118 is located. From the connection 117 the pipe 115 turns downwardly at 119 and enters the bottom of the sterilizer by the connecting pipe 120. The steam is admitted to the sterilizer by turning the valve 118 and the act of sterilization is continued for the appropriate length of time depending upon the nature of the food products undergoing sterilization. The drain or discharge valve 122 is then turned by means of the handle 123 and the condensate is discharged into the sewer or elsewhere through the drain pipe 124. The discharge valve 122 is located in the middle of the bottom side of the sterilizer. The stem of the valve 122 is articulated with the stem of the handle 123 by means of the usual spanner connection 121.

In order that the discharge valve 122 may be disconnected from the drain pipe 124 when the sterilizer 26 is swung upwardly to can receiving position and downwardly to can discharging position, the discharge end of the valve 122 is provided with a pipe section 125 which terminates in a vertically arranged flange 126 adapted to make a tight connection with a similarly arranged flange 127 on the upper offset end 128 of the drain pipe 124. To lock the flanges 126 and 127 together a collar 130 loosely mounted on the inner end of the pipe section 128 is provided with a pair of upper and lower laterally extending fingers 131 the outer ends of which extend inwardly toward each other and overlap the recessed cam surfaces 132 of the flange 126. To the upper finger 131 is pivotally connected the upper end of a link 133, the lower end of which is pivotally connected with a rod 134 slidingly mounted in the bosses 135 rising from the table 35. The outer end of the rod 134 is pivotally connected with the lower end of an operating arm or handle 136 pivoted in an upright 137 rising from the table 35. When the fingers 131 are in the center of the cam recesses 132 the flange 126 is free to swing in either direction past the flange 127. When, however, the fingers 131 have been turned in either direction to cause the inturned ends thereof to travel up the tapered ends 138 of the recesses 132 the flanges are locked together in a tight joint.

To reduce the temperature of the cans after the condensate has been drained from the sterilizer, cold water is admitted to the sterilizer through the pipe 140 which has the same kind of a connection 141 with the upper end of the arms 142 supported from the uprights 33 which the pipe 115 has with the arms 116. The pipe 140 has two branches, the branch 144 entering the top of the sterilizer and the branch 145 entering the bottom of the rear end of the sterilizer. The branch 144 is controlled by the valve 146 and the branch 145 is controlled by the valve 147. Drainage of the condensate and of the cooling water from the sterilizer is facilitated by means of a trough 148 built into the bottom of the sterilizer and extending throughout the length thereof. All the while the steam for sterilizing the cans and the water for cooling the cans are turned on the cans are caused to revolve in the sterilizer by means of the motor 67.

When the cans have become sufficiently cool the valves 146 and 147 are closed, and when all the cooling water has drained from the sterilizer the discharge valve 122 is closed. The clamps 55 are then released and the cover 44 slid into its inoperative position on the frame 48. The operator then tilts the forward end of the sterilizer downwardly into discharging position, having first removed the pin 36 and released the flanges 126 and 127. The magazine 29 having been moved into can receiving position with relation to the tilted sterilizer, as shown in Fig. 3, the operator inserts the wrench 79 into the socket 111 to turn the socket into normal position; thereupon the weight of the cans depresses the stop fingers 73 and the cans run down into the magazine 29.

The receiving magazine 29 is substantially the same in construction as the charging magazine 27, except that its position is reversed. It comprises a cylindrical shell supported on the two pairs of legs 150 and 151, provided at their lower ends with the wheels 152 adapted to travel on the track 153. The pairs of supporting legs for the magazine 29 are braced by the cross-pieces 154. The longitudinally extending can receiving tubes 155 of the magazine 29 have the same arrangement as the tubes 58 in the sterilizer. The upper ends of the tubes 155 are held in position in the shell of the magazine 29 by means of a plate 157 secured to the upper end of the magazine and provided with apertures the side of which snugly embrace the tubes 155. It will be observed that the upper ends of the tubes 155 project beyond the plate 157, so that when the extremities of the tubes 155 are in contact with the ends of the tubes 58 the plate 157 does not strike the flange 158 at the forward end of the sterilizer, thereby enabling the operator to remove the wrench 79 from the socket 111. The lower ends of the tubes 155 are secured in an apertured plate 159 to the outer face of which is secured the apertured plate 160. Between the plates 159 and 160 is an apertured rotatable plate 161 which is operated by means of the socketed shaft 162. These parts have the same construction and mode of operation as the corresponding parts at the discharge end of the hopper 28 and at the discharge end of the magazine 27. When the magazine 29 has received the cans from the sterilizer 26 the operator pushes the magazine 29 over against the mouth of the transferring mechanism 30.

The transferring mechanism serves to receive the cans from the magazine 29 and transfer them into the chute 31 through which they pass into the can shaking devices. At the mouth or entrance of the transferring mechanism is a series of tubes or chutes 163 which have the same number and arrangement as the tubes 155 in the magazine 29. These tubes 163 all terminate in a substantially vertical plane, therefore the lowermost tubes are longer than the upper tubes, as is seen in Fig. 20. The length of the uppermost tubes 164 is such that they hold only one can 165. The other tubes are proportionately longer and hold a proportionately greater number of cans. When the magazine 29 has been moved into contact with the flange 166 of the mouth of the casing 30 of the transferring mechanism and the socketed shaft 162 has been turned to release the cans in the tubes 155, the cans roll down into the tubes 163 and are held therein by means of the stop fingers 169. Each discharge end of the tubes 163 is provided with a stop finger, the forward end 170 of which is turned upwardly as a hook and is adapted to project through a cutaway portion in the bottom of each tube. The stop fingers 169 are fastened on the rods 172 pivotally supported from the under surface of the bottoms of the tubes 163. The upturned ends 170 of the fingers 169 are normally held raised in their can retaining positions by means of the weights 173 pivotally mounted on the upper ends of the arms 174 supported from the troughs or channels 175. Each weight 173 is provided with a rearwardly extending arm 177, the outer end of which is pivotally connected to the upper end of the link 178, the lower end of which is pivotally connected with an arm 179 secured to and extending forwardly from the corresponding shaft 172. When the weights 173 are raised, in the manner hereinafter described, the fingers 169 are depressed to release the foremost can in each tube 163.

The cans released by the depression of the stop fingers 169 roll into contact with the stop arms 181 pivotally mounted on the upwardly extending part 182 of the brackets 183 secured to and extending forwardly from the upper surfaces of the ends of the top walls of the tubes 163. Each tube 163 is provided opposite its open end with a stop arm 181, the head of which is in the path of travel of the cans released from the tubes. The cans caught by the stop arms 181 are held against the rear walls 184 of the channels 175 which are horizontally arranged and extend transversely across the lower ends of the tubes 163. Each channel is positioned below the open lower end of its corresponding row of tubes 163. All the channels except the lowermost channel are supported at their middle sections from the next succeeding row of tubes. The lowermost channel is supported at one end by the bracket 185 extending forwardly from the left hand bracket 186 secured to the rear wall 187 of the casing 30 and at its other end on the lowermost chute 190.

The cans 188 are held between the stop arms 181 and the rear walls 184 of the channels 175 to permit the stop fingers 169 to return to normal position retaining the cans in the tubes 163. When the fingers 169 have been returned to their normal can holding position, the arms 181 are then raised to permit the cans 188 to descend into the channels 175 whence they are removed and pushed into the open upper ends of the obliquely arranged chutes 190 positioned at the right of the ends of the channels 175, viewing Fig. 19, and upon which the right hand ends of the channels rest. The chutes 190 all discharge at their lower ends into the common chute 31 which conveys the cans to the can shaking devices.

The mechanism for releasing the fingers 169 and the arms 181 and for shoving the cans along the channels 175 to push them into the chutes 190 comprises the following instrumentalities:—Opposite the open end of each row of tubes 163 and located a little above the corresponding channel 175 is a chain 192 which travels in a horizontal plane and is supported at one end on the sprocket 193 mounted on the shaft 194 and at the other end on the sprocket 195 mounted on the shaft 196. The shafts 194 and 196 are vertically arranged and journaled in the outer ends of the brackets 186, 197, and 198. The upper ends of the shafts 194 and 195 are journaled in the bearings 199 secured to the underside of the top of the casing 30. On each chain 192 is a cam 200 which slopes rearwardly with respect to the direction of travel of the chain, which is toward the chutes 190. The section of the chain which is located adjacent to each channel rests on a shelf or ledge 209 supported from the adjacent edge of the channel. The upper part of the shaft 194 is provided with a miter gear 201 which meshes with a miter gear 202 mounted on one end of a shaft 203 journaled in the bifurcated bracket 204 depending from the top of the casing 30 and carrying on its outer end a pulley 205 driven by the belt 206. When the cams 200 pass under the weights 173 which are positioned above the sections of the chains traveling toward the chutes 190, the weights are raised, thereby depressing the fingers 169 and releasing the cans held by them. Immediately the cams 200 become disengaged from the weights 173, the weights return to normal position, raising the fingers 169 in front of the next succeeding cans in the tubes 163. The fingers 169 are free to rise because the cans just released by the depression of the fingers 169 are held by the arms 181 and the rear walls of the channels 175 and so hold back the other cans in the tubes 163.

The further travel of the cams 200 brings them under the stop arms 181, thereby successively raising the latter and permitting the cans held by them to fall fully into the channels 175. When all the cans have thus been placed longitudinally in the channels 175, the arms 208 projecting laterally from the chains 192 and positioned substantially equi-distant in both directions from the cams 200 engage with the foremost can in each channel and thereby move all the cans in the channels toward the chutes 190. As the cans reach the open upper ends 209 of the chutes 190 they fall therethrough into the chute 31.

The mode of operation of these devices is thus briefly resumed: When the cans are released from the magazine 29 they run into the tubes 163 and the foremost cans are held by the fingers 169. The engagement of the cams 200 with the weights 173 depresses the fingers 169 and releases the foremost cans in the tubes 163, permitting them to fall down into position to be caught by the arms 181 and the rear walls 184 of the channels 175. The space which separates the weights 173 from each first left hand arm 181 gives the weight 173 sufficient time to descend to return the fingers 169 to normal can holding position while the cams 200 are traveling from the weights 173 to the first arms 181. Consequently when the arms 181 are raised, permitting the cans to fall fully into the channels 175, the foremost cans in the tubes 163 are held until the fingers 169 are again depressed. When the cans are all in the channels 175 the arms 208 move into contact therewith and push them into the chutes 190.

The mode of operation of the improved sterilizing apparatus is recapitulated as follows:—It is assumed that a batch of sterilized cans has been discharged into the receiving magazine 29 and that the sterilizer 26 has been tilted upwardly into the position shown in Fig. 2. While one batch of cans is undergoing sterilization a fresh supply of cans is being fed into the charging magazine 27 from the hopper 28. When the sterilizer 26 is tilted upwardly, the operator moves the lower end of the magazine 27 into contact with the upper end of the sterilizer and inserts the wrench or handle 99 into the socket 100 and turns the plate 89 to put the holes 94 therein in alinement with the apertures 93 and the tubes 81 to permit the cans to roll down into the sterilizer. The operator then turns the wrench 99 in the reverse direction to shift the plate 89 into its can holding position and moves the magazine 27 to bring its upper end into contact with the discharge end of the hopper 28, after which he inserts the wrench 99 into the socket 108 to turn the plate 106 into can releasing position.

Before the door or cover 44 of the sterilizer is slid into position over the open end thereof the operator inserts the wrench 79 into the socket 111 and manipulates it to position the stop fingers 73 in front of the cans. The fingers are locked in their can holding position by placing the end of the arm 78 of the socket 111 against the projection 80 of the arm 77. When the cover 44 has been placed in position on the open end of the sterilizer the clamps 55 are manipulated to fasten it thereto. The sterilizer is then tilted to its horizontal position, the pin 36 is inserted in its hole in the arm 40 and the projection 37 to hold the sterilizer stationary, and the handle 136 is moved in either direction to lock the flanges 126 and 127 together. The operator then turns the valve 118 to admit steam to the sterilizer, the motor 67 having been started in operation to cause the can supporting spider to rotate in the sterilizer and so assure an equal distribution of the sterilizing medium through the interstices between the cans, thereby effecting a uniform sterilization of the contents of the cans. When the sterilizing operation has been carried on for the requisite length of time, depending upon the nature of the food products undergoing sterilization, the valve 118 is closed and the drain or discharge valve 122 is opened by turning the handle 123 to discharge the condensate into the drain pipe 124. The valve 122 is then closed and the valves 146 and 147 are opened to admit cold water into the sterilizer. It is sometimes desirable to leave the drain valve 122 partially open when the valves 146 and 147 are opened so as to permit the heated water to flow down into the drain pipe. The precise mode of procedure will be decided upon by the operator according to conditions. When the cans have become sufficiently cool the valves 146 and 147 are closed and the valve 122 fully opened.

The sterilized cans are now in condition to be discharged into the receiving magazine 29. The pin 36 is removed, the handle 136 manipulated, the clamps 55 loosened and thrown back, and the door or cover 44 slid into its inoperative position on the holding frame 48. When the receiving magazine 29 has been moved into engagement with the open ends of the tubes 58 in the sterilizer the operator inserts the wrench 79 into the socket 111 to disengage the end of the arm 78 from the projection 80, thereby permitting the cans to depress the stop fingers 73 and roll down into the magazine 29. Thereupon the operator pushes the magazine along the runway 153 to bring the discharge end thereof into contact with the mouth of the transferring magazine 30.

Manipulating the plate 161 in the discharge end of the magazine 29 to release the cans therein does not of course permit all the cans immediately to run out of the magazine, because the tubes 163 in the transferring mechanism can hold only a small proportion of them. Consequently the magazine 29 remains in position against the mouth of the transferring mechanism until all the cans have been shot down the chute 31. The cans fed into the tubes 163 from the magazine 29 are released one by one by the actuation of the stop fingers 169 when the travel of the chains 192 in a clockwise direction brings the cams 200 under the weights 173 and lifts them thereby depressing the hooked ends 170 of the stop fingers 169. In order that the stop fingers 169 may swing back in operative position holding the cans in the tubes 163, the cans just released are held by the stop arms 181 until the cams 200 pass under them successively, raising them and thereby permitting the cans 188 to fall into the channels or troughs 175 in position for the arms 208 to push them over the openings 209 of the chutes 190 leading into the receiving end of the chute 31, whence they are conducted to the shaking devices.

Having thus described the invention what I claim as new is:—

1. A sterilizing apparatus comprising, a sterilizer mounted to swing in a vertical plane and having an open end adapted to be closed by a cover, a movably mounted magazine for containing the articles to be sterilized and for feeding the articles into the sterilizer when the open end of the latter is pointed upwardly, a movably mounted receiving magazine for receiving the articles from the sterilizer when the open end of the latter is pointed downwardly, and means into which the receiving magazine discharges the articles.

2. A sterilizing apparatus comprising, a movably mounted sterilizer having an open end adapted to be closed by a cover, a magazine of the same capacity as the sterilizer for feeding the articles to be sterilized into the sterilizer, and a second magazine movable to position to receive the sterilized articles from the sterilizer.

3. A sterilizing apparatus comprising, a sterilizer mounted to swing in a vertical plane and provided at one end with a removable cover, an obliquely arranged magazine for containing the articles to be sterilized, means connected with the lower end of the magazine for holding the articles therein until it is adjacent to the upturned end of the sterilizer, an obliquely arranged receiving magazine having an upper open end adapted to receive the sterilized articles from the sterilizer, and means connected with the lower end of the receiving magazine for holding the articles therein until they are to be discharged therefrom.

4. A sterilizing apparatus comprising, a cylindrical receptacle mounted to tilt on a vertical plane and having a removable cover at its front end, an obliquely arranged charging magazine of the same capacity as the receptacle for feeding the articles into the receptacle when its front end is tilted upwardly, and an obliquely arranged receiving magazine adapted to receive the articles from the receptacle when the front end of the latter is tilted downwardly.

5. A sterilizing apparatus comprising, a receptacle mounted to swing on a vertical plane and having an open end adapted to be closed by a cover, means for feeding the articles to be sterilized into the receptacle, a movable obliquely arranged magazine for receiving the sterilized articles from the receptacle, said magazine having an open upper end adapted to be placed adjacent to the open end of the sterilizer when the latter is tilted downwardly, and means connected with the sterilizer for holding the articles therein until the open upper end of the magazine is adjacent to the open end of the sterilizer.

6. A sterilizing apparatus comprising, a sterilizer having an open end adapted to be closed by a cover, said sterilizer being movable to one position to receive the articles to be sterilized and movable to another position to discharge the sterilized articles, means for feeding a predetermined number of articles into the sterilizer as a single batch when the sterilizer is in receiving position, and means for receiving the articles as a single batch from the sterilizer when the latter is in discharging position.

7. A sterilizing apparatus comprising, a sterilizer mounted to swing in a vertical plane and having an open end adapted to be closed by a cover, a movable obliquely arranged magazine of the same capacity as the sterilizer for containing the articles to be sterilized, the lower end of said magazine being adapted to be placed against the open end of the sterilizer when it is tilted upwardly, and for holding the articles in the magazine until the lower end of the magazine is adjacent to the upper end of the sterilizer.

8. A sterilizing apparatus comprising, a cylindrical sterilizing receptacle open at one end adapted to be closed by a cover, a pair of trunnions on which the receptacle is mounted whereby the open end of the receptacle may be swung upwardly to position to receive the articles to be sterilized and be swung downwardly to position to discharge the sterilized articles, means movable to position to feed the articles to be sterilized into the receptacle, and means movable to position to receive the sterilized articles from the receptacle.

9. A sterilizing apparatus comprising, a cylindrical receptacle open at one end, a movable cover for closing the open end of the receptacle during the sterilizing operation, a frame work supported from the receptacle for holding the cover in inoperative position, said receptacle being movable to one position to receive the articles to be sterilized and to another position to discharge the sterilized articles therefrom, means for feeding the articles to be sterilized into the receptacle, and means for receiving the sterilized articles therefrom.

10. A sterilizing apparatus comprising, a cylindrical sterilizer open at one end and provided with a pair of horizontally disposed trunnions mounted so that the sterilizer may tilt in a vertical plane, a movable cover for closing the open end of the sterilizer, a runway supported from the sterilizer on which the cover is adapted to slide into and out of operative position, a movable obliquely arranged magazine for feeding a predetermined number of cans into the sterilizer, and a movable obliquely arranged magazine for receiving the sterilized cans from the sterilizer.

11. A sterilizing apparatus comprising, a sterilizer mounted to move to one position to receive the articles to be sterilized and to another position to discharge the sterilized articles, a series of elongated tubes in the sterilizer for holding the articles to be sterilized, a charging magazine having a series of tubes corresponding in number and arrangement to the tubes in the sterilizer for charging the articles to be sterilized into the sterilizer, and a receiving magazine having a series of tubes of the same number and arrangement as the tubes in the sterilizer for receiving the articles from the sterilizer.

12. A sterilizing apparatus comprising, a cylindrical sterilizer having an open end adapted to be closed by a cover, said sterilizer being mounted to tilt upwardly into receiving position and to tilt downwardly into discharging position, a series of tiers of elongated tubes in the sterilizer for holding the articles to be sterilized, an obliquely arranged charging magazine having a series of tiers of tubes of the same number and arrangement as the tubes in the sterilizer for containing the articles to be sterilized, said charging magazine being movable to place the lower end thereof adjacent to the open upturned end of the sterilizer, means for holding the cans in the charging magazine and for releasing them, an obliquely arranged receiving magazine having a series of tiers of elongated tubes therein of the same number and arrangement as the tubes in the sterilizer, the upper end of the tubes in the receiving magazine being open, and means for closing the lower ends of the tubes in the receiving magazine.

BURT E. TAYLOR.